(12) United States Patent
Shin et al.

(10) Patent No.: US 11,924,052 B2
(45) Date of Patent: Mar. 5, 2024

(54) MANAGEMENT SERVER THAT CONTROLS NETWORK DEVICES, AND PROCESSING METHODS OF NETWORK DEVICES AND MODEL MANAGEMENT SERVERS

(71) Applicant: Electronics and Telecommunications Research Institute, Daejeon (KR)

(72) Inventors: Myung Ki Shin, Sejong-si (KR); Soohwan Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/484,367

(22) Filed: Sep. 24, 2021

(65) Prior Publication Data
US 2022/0094607 A1    Mar. 24, 2022

(30) Foreign Application Priority Data

Sep. 24, 2020  (KR) .................. 10-2020-0124263
Sep. 24, 2021  (KR) .................. 10-2021-0126531

(51) Int. Cl.
| | | |
|---|---|---|
| H04L 41/16 | (2022.01) | |
| G06F 18/214 | (2023.01) | |
| H04L 41/14 | (2022.01) | |
| H04L 43/08 | (2022.01) | |

(52) U.S. Cl.
CPC ............ *H04L 41/16* (2013.01); *G06F 18/214* (2023.01); *H04L 41/145* (2013.01); *H04L 43/08* (2013.01)

(58) Field of Classification Search
CPC ........ H04L 41/16; H04L 41/145; H04L 43/08
See application file for complete search history.

(56) References Cited

U.S. PATENT DOCUMENTS

| | | | |
|---|---|---|---|
| 8,181,195 B2 | 5/2012 | Sardera | |
| 10,122,578 B1 * | 11/2018 | Magerramov | ...... H04L 41/0813 |
| 11,026,103 B2 * | 6/2021 | Gupta | ..................... H04L 41/16 |
| 2006/0123387 A1 | 6/2006 | Shim et al. | |

(Continued)

FOREIGN PATENT DOCUMENTS

EP    3 131 234    2/2017

OTHER PUBLICATIONS

Jonghwan Hyun et al., "Towards Knowledge-Defined Networking using In-band Network Telemetry"; IEEE 2018.

*Primary Examiner* — Viet D Vu
(74) *Attorney, Agent, or Firm* — KILE PARK REED & HOUTTEMAN PLLC

(57) ABSTRACT

A network device divided into a training plane and a control plane, model management server that controls a network device, and processing methods of a network device and model management server are disclosed. A processing method may include receiving a machine learning model from a model management server, obtaining network data to generate analytics information, generating analytics information by inputting the network data to a machine learning model, feeding back the analytics information to the model management server, and generating a control command of the network device using the analytics information, wherein the analytics information is generated by a training plane function and the control command is generated by a control plane function.

7 Claims, 6 Drawing Sheets

(56) References Cited

U.S. PATENT DOCUMENTS

| | | | |
|---|---|---|---|
| 2013/0318609 A1 | 11/2013 | Kim et al. | |
| 2013/0332399 A1* | 12/2013 | Reddy | H04L 45/38 |
| | | | 706/12 |
| 2019/0173761 A1* | 6/2019 | Byers | H04L 43/50 |
| 2019/0320329 A1* | 10/2019 | Gódor | H04W 16/22 |
| 2020/0302913 A1* | 9/2020 | Marcinkiewicz | G10L 13/033 |
| 2021/0084093 A1* | 3/2021 | Gunnalan | H04L 65/80 |

* cited by examiner

MANAGEMENT SERVER THAT CONTROLS NETWORK DEVICES, AND PROCESSING METHODS OF NETWORK DEVICES AND MODEL MANAGEMENT SERVERS

CROSS-REFERENCE TO RELATED APPLICATION

This application claims the benefit of Korean Patent Application No. 10-2020-0124263 filed on Sep. 24, 2020, and Korean Patent Application No. 10-2021-0126531 filed on Sep. 24, 2021, in the Korean Intellectual Property Office, the entire disclosures of which are incorporated herein by reference for all purposes.

BACKGROUND

1. Field of the Invention

One or more example embodiments relate to network devices divided into training planes and control planes, and a model management server that controls network devices.

2. Description of the Related Art

A conventional network is divided into a user plane and a control plane and is configured in a network device corresponding to the user plane and a network device corresponding to a control plane. The user plane corresponds to a network device performing a function of connecting a user terminal and a data network, and the control plane corresponds to a network device performing a function of overall controlling a user terminal.

More particularly, the network device corresponding to the control plane may perform diverse control operations for a user terminal by an internal algorithm. As shown above, the network device using the internal algorithm has difficulty supporting complete automation.

SUMMARY

Example embodiments provide a method and device to support complete automation by defining a training plane function which automatically generates a control command through a machine learning model and then separating a network device corresponding to a control plane into a control plane function and a training plane function.

Example embodiments provide a method and device capable of flexible control by analyzing network data using a machine learning model and supporting a training plane function which generates a control command of the network data based on a result of analyzing the network data.

According to an aspect, there is provided a processing method performed by a network device, the processing method including receiving a machine learning model from a model management server, obtaining network data to generate analytics information, generating analytics information by inputting the network data to a machine learning model, feeding back the analytics information to the model management server, and generating a control command of the network device using the analytics information, wherein the analytics information is generated by a training plane function and the control command is generated by a control plane function.

The model management server may charge for providing the machine learning model to the network device.

The model management server may set a charge for the machine learning model based on at least one of a property of the network device, a parameter of the machine learning model, a quality of the machine learning model, or a point in time at which the machine learning model is to be provided.

The generating of the control command may include generating the control command to control a user terminal based on the analytics information.

According to an aspect, there is provided a processing method performed by a network device, the processing method including receiving a machine learning model from a model management server, obtaining network data to generate analytics information, extracting analytics information by inputting the network data to a machine learning model, updating the machine learning model using the analytics information, and generating a control command of the network device using the analytics information, wherein the analytics information is generated by a training plane function and the control command is generated by a control plane function.

The model management server may train the machine learning model and may charge for providing the machine learning model.

The model management server may set a charge for the machine learning model based on at least one of a property of the network device, a parameter of the machine learning model, a quality of the machine learning model, or a point in time at which the machine learning model is to be provided.

The generating of the control command may include generating the control command to control a user terminal based on the analytics information.

According to an aspect, there is provided a processing method performed by a model management server, the processing method including providing a machine learning model to a network device, and charging for providing the machine learning model, wherein the network device is configured to analyze network data using a machine learning model in a training plane, and generate a control command to control a user terminal using analytics information which is a result of analyzing the network data in a control plane.

The charging may include setting a charge for the machine learning model based on at least one of a property of the network device, a parameter of the machine learning model, a quality of the machine learning model, or a point in time at which the machine learning model is to be provided.

The network device may be configured to feed back analytics information which is a result of analyzing the network data to the model management server, wherein the model management server trains the machine learning model using the fed back analytics information or additionally collected network data.

The network device may be configured to feed back analytics information which is a result of analyzing the network data to the model management server, wherein the model management server trains the machine learning model using the fed back analytics information or additionally collected network data.

Additional aspects of example embodiments will be set forth in part in the description which follows and, in part, will be apparent from the description, or may be learned by practice of the disclosure.

According to example embodiments, after defining a training plane function that automatically generates a control command through a machine learning model, a network device corresponding to a control plane may be divided into a control plane function and the training plane function to support complete automation.

According to example embodiments, flexible control may be possible by supporting a training plane function that analyzes network data using a machine learning model and generates a control command of network data based on a network data analysis result.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
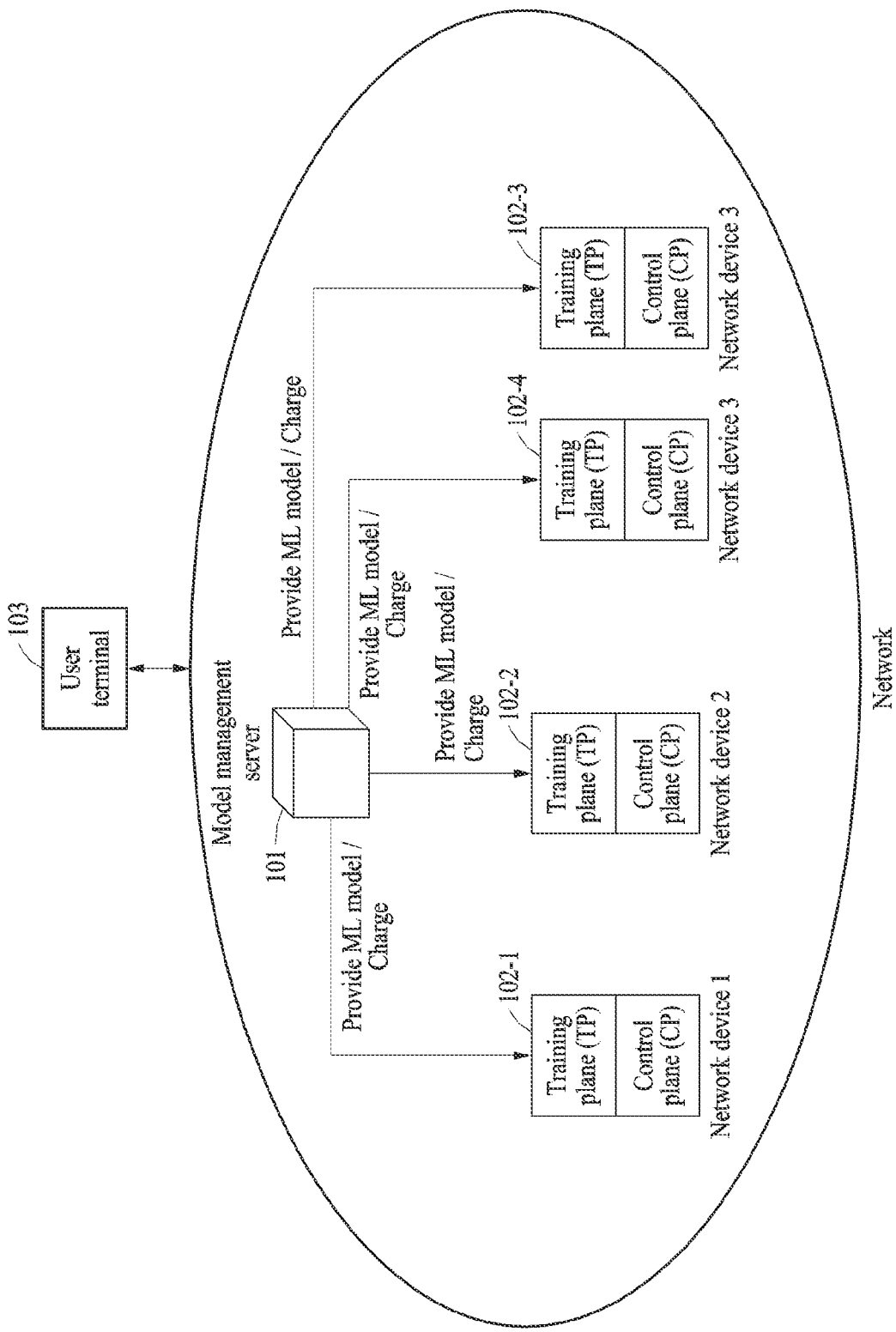
FIG. 1 is a diagram illustrating an operation of a network device and a model management server according to an example embodiment.

Hereinafter, examples will be described in detail with reference to the accompanying drawings. The scope of the right, however, should not be construed as limited to the example embodiments set forth herein. In the drawings, like reference numerals are used for like elements.

Various modifications may be made to the examples. Here, the examples are not construed as limited to the disclosure and should be understood to include all changes, equivalents, and replacements within the idea and the technical scope of the disclosure.

Although terms of "first" or "second" are used to explain various components, the components are not limited to the terms. These terms should be used only to distinguish one component from another component. For example, a first component may be referred to as a second component, and similarly the second component may also be referred to as the first component.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Hereinafter, example embodiments will be described in detail with reference to the accompanying drawings.

FIG. 1 is a diagram illustrating an operation of a network device and a model management server according to an example embodiment.

Referring to FIG. 1, a network 100 may be configured in a model management server 101 and a plurality of network devices 102-1 to 102-4. Here, each of the network devices 102-1 to 102-4 may support a training plane function and a control plane function. By separating each of the network devices 102-1 to 102-4 into the training plane function and control plane function, network automation may be implemented.

For example, if the network 100 is a 5G core network, the network devices 102-1 to 102-4 may be one of access and mobility management function (AMF), policy control function (PCF), session management function (SMF), and unified data management (UDM) corresponding to the control plane. The present disclosure is not limited thereto. In addition, entities included in a network generating a control command may be network devices.

The training plane function may relate to a function to analyze network data obtained by the network devices 102-1 to 102-4 using a machine learning (ML) model provided by the model management server 101. In addition, the control plane function may generate diverse control commands required by the network devices 102-1 to 102-4 by using a result of analyzing the network data in the training plane function. The control command may be used to control a user terminal 103 based on unique functions of the network devices 102-1 to 102-4.

Then, the network devices 102-1 to 102-4 may operate based on the control command. That is, the control plane function does not generate a control command based on a predetermined internal algorithm, but may generate analytics information by analyzing, using an ML model, network data obtained by the network devices 102-1 to 102-4. In addition, the network devices 102-1 to 102-4 may generate the control command based on the analytics information. Here, the control command may be used to control the user terminal 103 connected to the network 100.

The network devices 102-1 to 102-4 do not generate a control command to control the user terminal 103 based on a predetermined regulation, rule, policy, or algorithm. However, the network devices 102-1 to 102-4 may generate a more automated and flexible control command by separating the control plane and the training plane, obtaining network data related to a user terminal in the training plane and analyzing the network data using an ML model.

The model management server 101 may provide an ML model which generates analytics information the network devices 102-1 to 102-4 require to generate a control command. For example, the ML model may include a neural network configured in a plurality of layers. The model management server 101 may provide the ML model to the training plane function of the network devices 102-1 to 102-4 and may charge for providing the ML model.

The model management server 101 may update an ML model when it receives feedback from the network devices 102-1 to 102-4 in the form of analytics information resulting from an analysis of network data. That is, the model management server 101 may train the ML model.

The model management server 101 may provide an ML model to the network devices 102-1 to 102-4 and may directly update the ML model using analytics information which is a result of analyzing network data obtained by the network devices 102-1 to 102-4.

Figure 2:
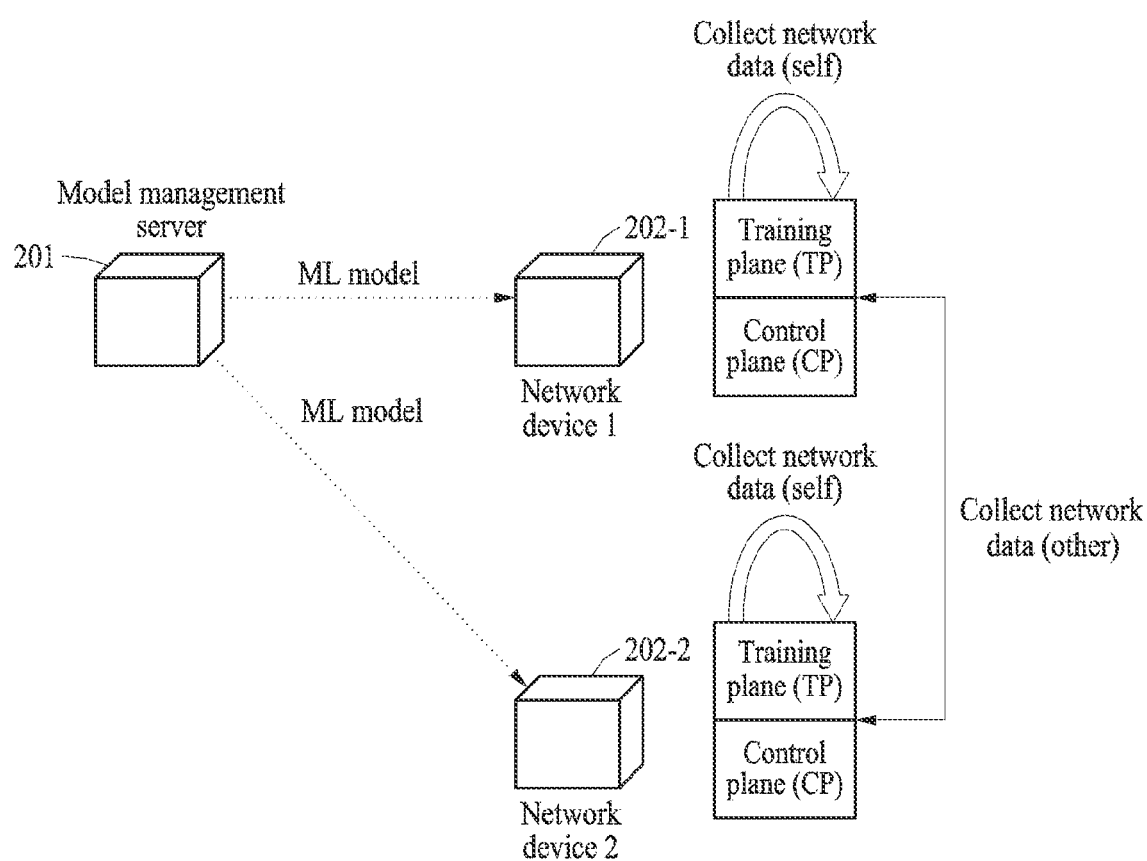
FIG. 2 is a diagram illustrating a process of providing a machine learning model to a network device by a model management server and receiving a data analysis result using the machine learning model according to an example embodiment.

FIG. 2 is a diagram illustrating a process of providing a machine learning model to a network device by a model management server and receiving a data analysis result using the machine learning model according to an example embodiment.

Referring to FIG. 2, a model management server 201 may respectively provide ML models to the network devices 1 202-1 and 2 202-2 configuring a network. The model management server 201 may train an ML model using network data.

Here, the model management server 201 may provide an ML model corresponding to a control operation performed by the network devices 1 202-1 and 2 202-2 respectively. For example, when the network device 1 202-1 supports AMF, the model management server 201 may provide an ML model for mobility management of a user terminal to the network device 1 202-1. In addition, for example, when the network device 2 202-2 supports SMF, the model management server 201 may provide an ML model for session management of a user terminal to the network device 2 202-2.

The model management server 201 may provide an ML model which is set as a default to the network devices 1 202-1 to 2 202-2. Alternatively, the model management server 201 may provide a list of ML models to the network devices 1 202-1 and 2 202-2 and may provide an ML model selected by a network device. Here, an ML model included in the list may be identified by size of training data set, training frequency of the ML model, number of layers configured in the ML model, and number of updates of the ML model and a billing charge may be determined differently based on a model selected by a network device.

The model management server 201 may provide an ML model to the network devices 1 202-1 and 2 202-2 in a period determined based on a preset policy, without a request from a network device. Alternatively, the model management server 201 may provide an ML model to the network devices 1 202-1 and 2 202-2 in response to a request from the network devices.

The model management server 201 may charge for providing an ML model to a network device. Here, the higher the quality of the ML model, the higher the charge may be. The higher the version of the ML model provided by the model management server 201, the higher the quality of the ML model may be. The ML model may be updated to a higher version in response to being additionally trained based on network data directly collected by the model management server 201 or analytics information fed back from the network device. In addition, the quality of the ML model may vary based on a parameter (for example, number of layers configuring the ML model, number of times being trained, and combination of different ML models) of the ML model.

In addition, the model management server 201 may charge based on a preset use period of the ML model or may charge each time the ML model is provided. Moreover, the model management server 201 may charge considering at point in time at which the ML model is provided. For example, the model management server 201 may determine to charge more to a network device additionally set to a network than a network device initially set to the network.

Alternatively, the model management server 201 may charge differently based on properties of the network devices 1 202-1 and 2 202-2. For example, a charge may vary based on the types of functions the network devices 1 202-1 and 2 202-2 perform, or a charge may increase as a number of user terminals managed by the network devices 1 202-1 and 2 202-2 increases.

The network devices 1 202-1 and 2 202-2 may collect network data. Here, the network data may include network data generated by the network device 1 202-1 by itself or network data generated by the network device 2 202-2 performing a function related to a function performed by the network device 1 202-1 or a function that is the same as the function performed by the network device 1 202-1.

The network device 1 202-1 may analyze network data using an ML model provided by the model management server 201. A result of analyzing the network data may be analytics information of the network data related to a user terminal. A process of analyzing network data may be performed by a training plane function using the ML model provided by the model management server 201.

In addition, the process of analyzing network data may be performed when a new ML model is provided by the model management server 201 or previously collected network data is modified (updated, added, deleted, or edited), or may be performed based on a preset period.

The network devices 1 202-1 and 2 202-2 may each collect network data by themselves. In addition, when the network devices 1 202-1 and 2 202-2 perform a same function, have similar local ranges, or are related to a same user terminal, network data collected by the network device 1 202-1 may be utilized in the network device 2 202-2. The network data may be limited data (local data) limited to a network device or shared data (global data) shared throughout a network.

The network devices 1 202-1 or 2 202-2 may generate analytics information on corresponding ML models using a plurality of ML models. Here, analytics information used for generating a control command may be a result of combining analytics information drawn from ML models or may be analytics information satisfying a predetermined reliability or evaluation criterion.

In the training plane, the network devices 1 202-1 or 2 202-2 may train an ML model using network data. In addition, a result of training the ML model may be fed back to the model management server 201. The result of training the ML model may be related to a parameter of the ML model.

Figure 3:
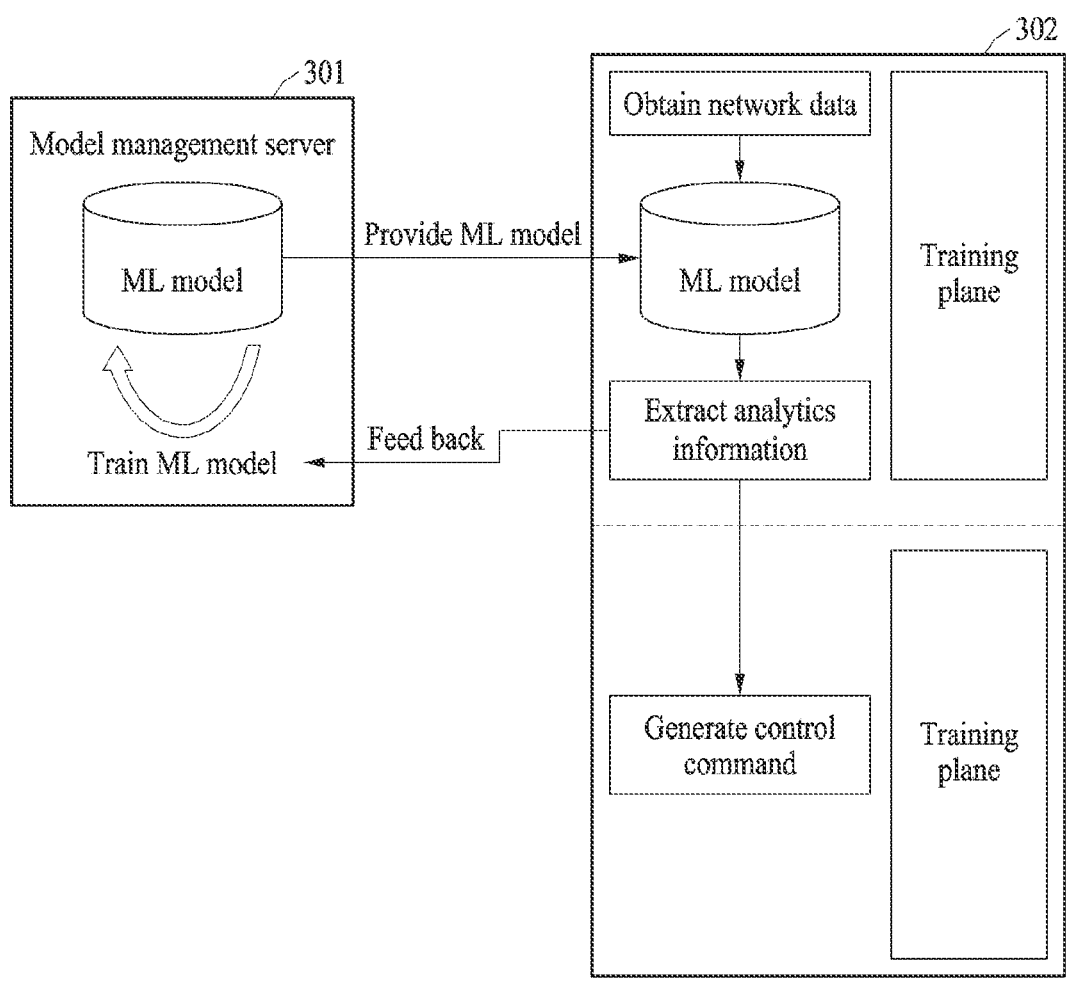
FIG. 3 is a diagram illustrating a process of generating a control command using a machine learning model by a network device according to a first example embodiment.

FIG. 3 is a diagram illustrating a process of generating a control command using a machine learning model by a network device according to a first example embodiment.

FIG. 3 illustrates a process of training an ML model by a model management server 301 and extracting, by a network device 302, analytics information using a trained ML model in the model management server 301.

The model management server 301 may generate and train an ML model. The model management server 301 may secure a unique ML model corresponding to a function of a network device.

The model management server 301 may provide the ML model to the network device 302. The network device 302 may collect network data related to a user terminal in a training plane. In addition, the network device 302 may extract analytics information from the network data using the ML model in the training plane.

In case of FIG. 3, the model management server 301 may use analytics information fed back from the network device 302 to additionally train the ML model. The model management server 301 may update the ML model by additionally training the ML model using the analytics information fed back from the network device 302.

The network device 302 may directly collect network data or may obtain network data from another network device performing a same function. The network data may be collected in a preset period or each time the network data is generated or modified.

In addition, the network device 302 may analyze the network data using an ML model in the training plane. A result of analyzing network data may be provided to a control plane of the network device 302. Here, when the result of analyzing network data is generated in the training plane, analytics information which is the result of analyzing network data may be provided to the control plane of the network device 302.

A control command may be generated in the control plane of the network device 302 using analytics information to control a user terminal. The network device 302 may perform a predetermined operation based on the control command.

Figure 4:
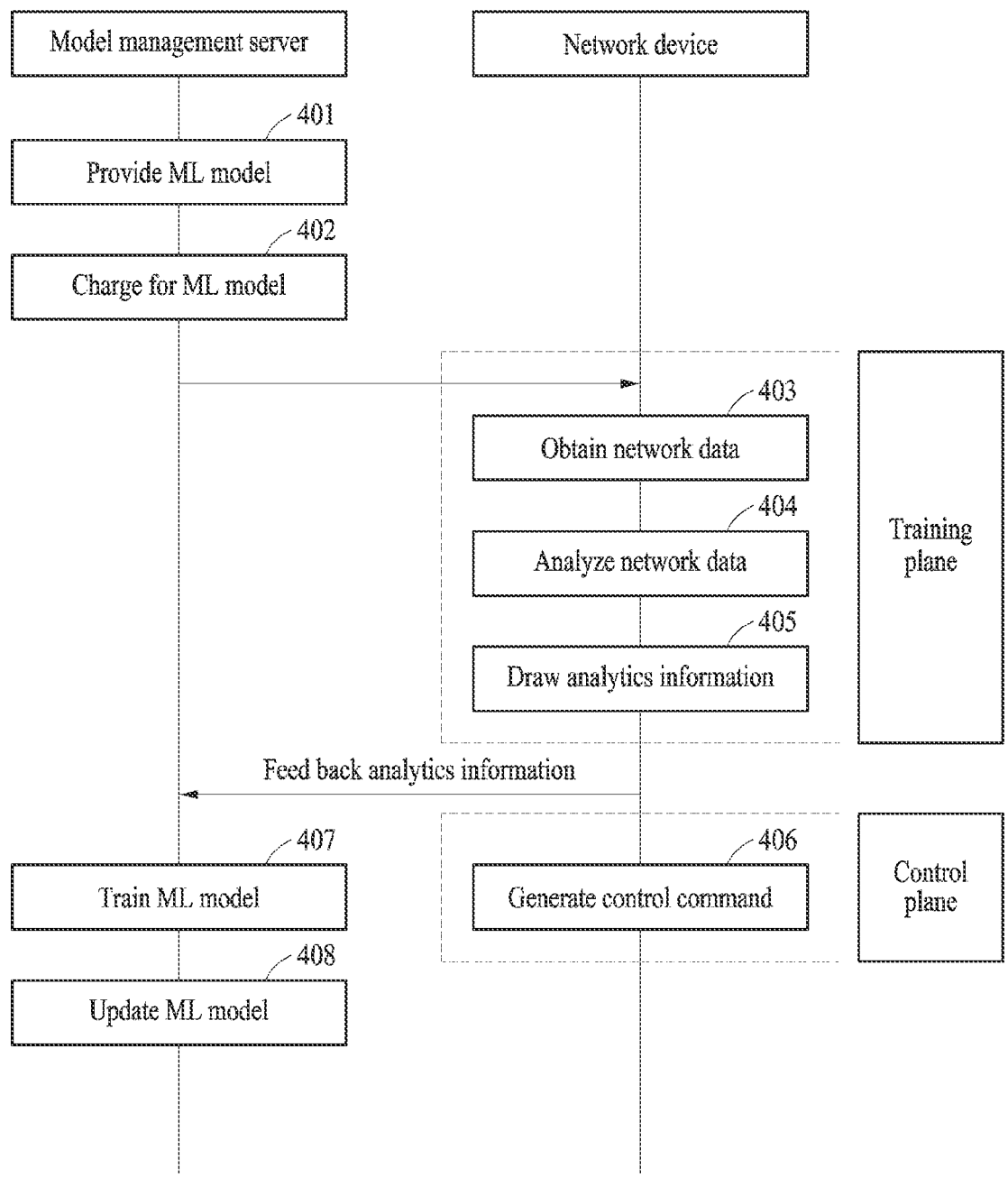
FIG. 4 is a flowchart illustrating a processing method performed by a model management server according to the first example embodiment.

FIG. 4 is a flowchart illustrating a processing method performed by a model management server according to the first example embodiment.

In operation 401 of FIG. 4, a model management server may provide an ML model to a network device.

In operation 402, the model management server may charge for providing the ML model.

In operation 403, the network device may obtain network data.

In operation 404, the network device may analyze the network data using the ML model received from the model management server.

In operation 405, the network device may generate analytics information which is a result of the network data analysis.

Operations 403 to 405 may be performed in a training plane of the network device.

In operation 406, the network device may generate a control command to control a user terminal connected to a network. Operation 406 may be performed in a control plane of the network device.

In operation 407, the model management server may additionally train the ML model when it receives the analytics information fed back from the network device.

In operation 408, the model management server may update the ML model in response to the ML model being additionally trained. As a result of the updating, the version of the ML model may change to a higher version.

Figure 5:
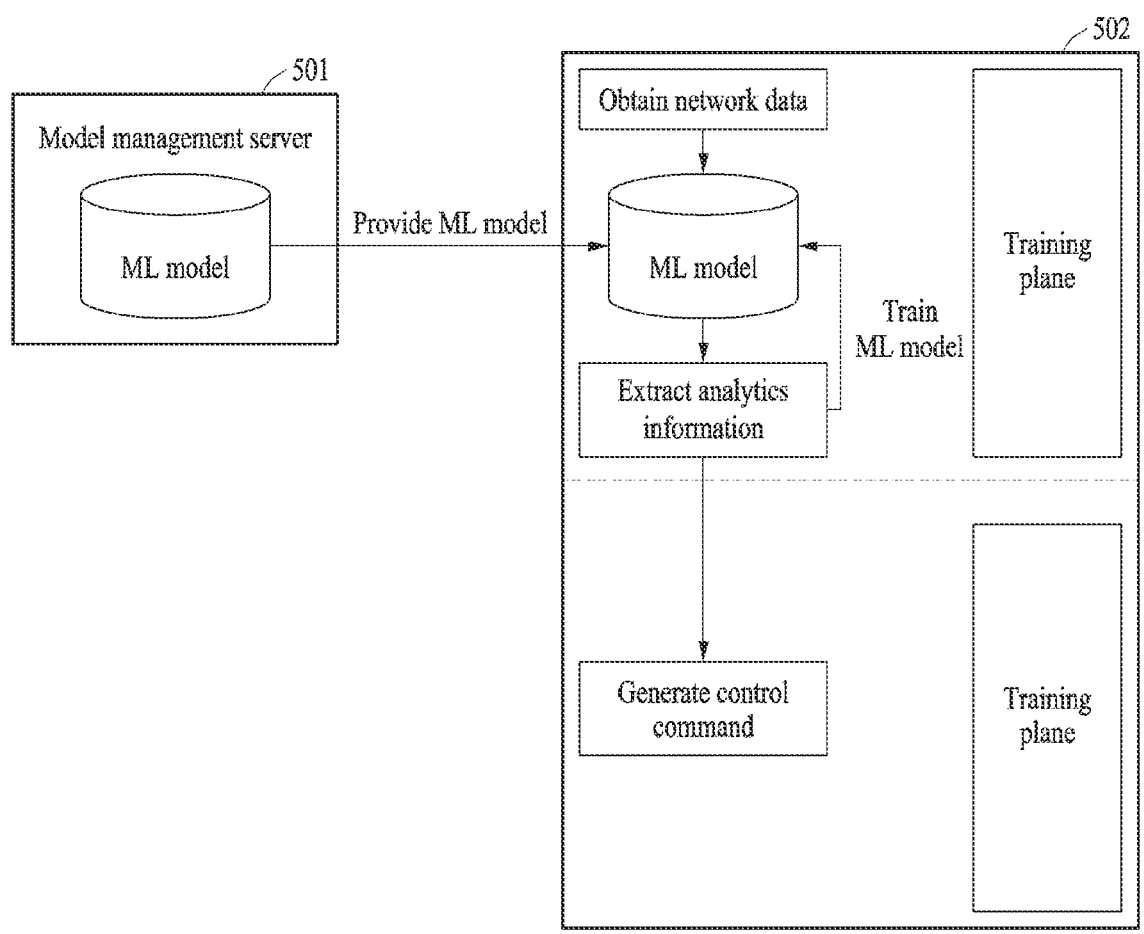
FIG. 5 is a diagram illustrating a process of generating a control command using a machine learning model by a network device according to a second example embodiment.

FIG. 5 is a diagram illustrating a process of generating a control command using a machine learning model by a network device according to a second example embodiment.

FIG. 5 illustrates a process of providing an ML model in an initial stage by a model management server 501, training the ML model and extracting, by a network device 502, analytics information using the ML model trained in the model management server 501.

The model management server 501 may generate an ML model. The model management server 501 may secure a unique ML model corresponding to a function of a network device.

The model management server 501 may provide the ML model to the network device 502. The network device 502 may collect network data related to a user terminal in a training plane. In addition, the network device 502 may extract analytics information from the network data using the ML model in the training plane.

In case of FIG. 5, the network device 502 may additionally train the ML model in the training plane. Network data additionally collected by the network device 502 or previously generated analytics information may be used to additionally train the ML model. The network device 502 may update the ML model by additionally training the ML model using additionally collected network data or analytics information which is a result of analyzing network data.

The network device 502 may directly collect network data or may obtain network data from another network device performing a same function. The network data may be collected by a preset period or each time network data is generated or modified.

In addition, the network device 502 may analyze the network data using an ML model in the training plane. A result of analyzing network data may be provided to a control plane of the network device 502. Here, when a result of analyzing network data is generated in the training plane, the result, which is analytics information, may be provided to the control plane of the network device 502.

A control command may be generated in the control plane of the network device 502 using analytics information to control a user terminal. The network device 502 may perform a predetermined operation based on the control command.

Figure 6:
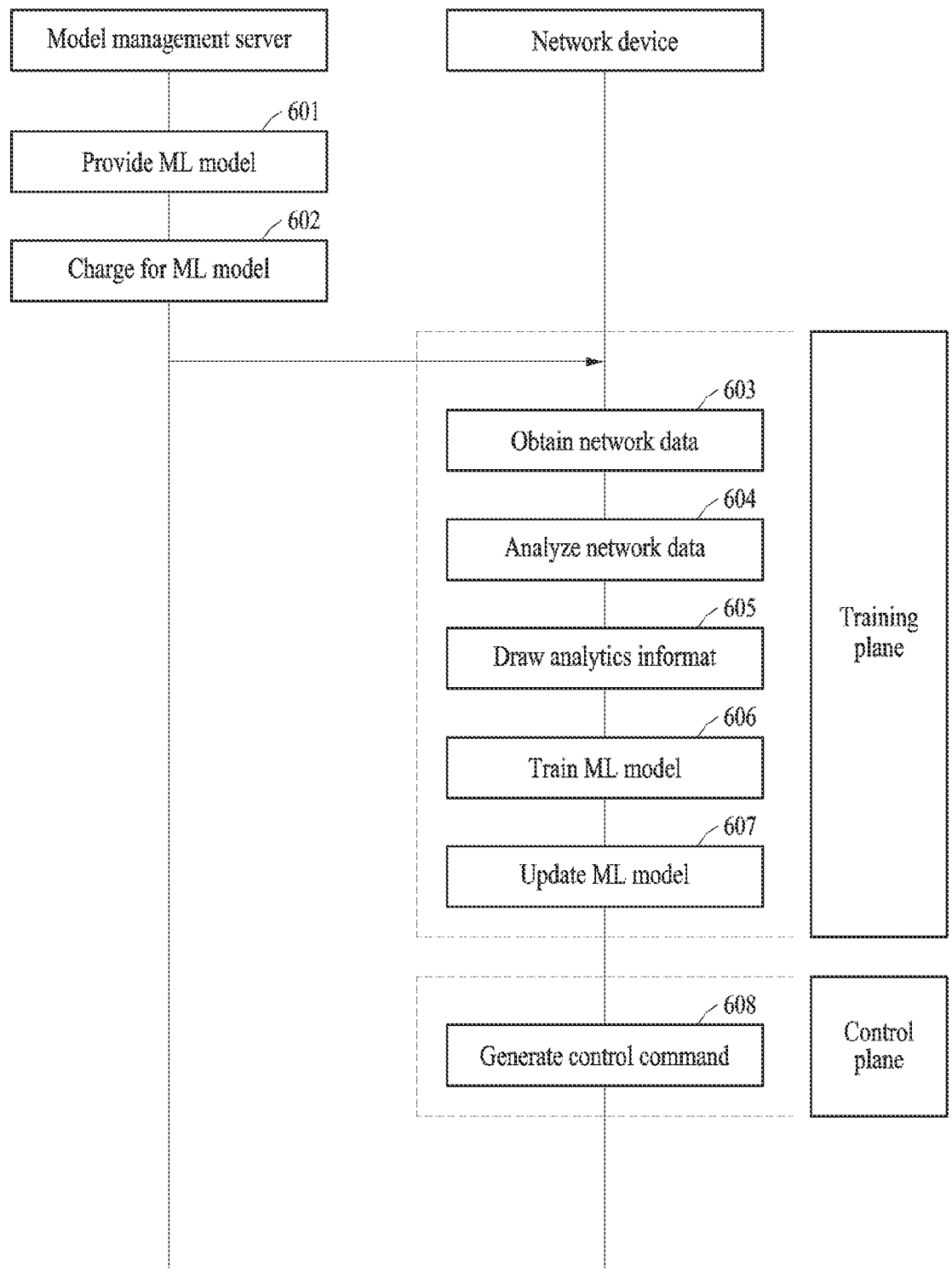
FIG. 6 is a flowchart illustrating a processing method performed by a model management server according to the second example embodiment.

FIG. 6 is a flowchart illustrating a processing method performed by a model management server according to the second example embodiment.

In operation 601 of FIG. 6, a model management server may provide an ML model to a network device.

In operation 602, the model management server may charge for providing the ML model.

In operation 603, the network device may obtain network data.

In operation 604, the network device may analyze the network data using the ML model received from the model management server.

In operation 605, the network device may generate analytics information which is a result of the network data analysis.

In operation 606, the network device may additionally train the ML model using the analytics information or additionally obtained network data.

In operation 607, the network device may update the ML model in response to the ML model being additionally trained. As a result of the updating, the version of the ML model may change to a higher version.

Operations 603 to 607 may be performed in a training plane of the network device.

In operation 608, the network device may generate a control command to control a user terminal connected to a network. Operation 608 may be performed in the control plane of the network device.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, for example, a computer program tangibly embodied in a machine readable storage device (a computer-readable medium) to process the operations of a data processing device, for example, a programmable processor, a computer, or a plurality of computers or to control the operations. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A processing method performed by a network device, the processing method comprising:
receiving a machine learning model from a model management server;
obtaining network data to generate analytics information;
generating analytics information by inputting the network data to a machine learning model;
feeding back the analytics information to the model management server; and
generating a control command of the network device using the analytics information, wherein the analytics information is generated by a training plane function of the network device and the control command is generated using the analytics information by a control plane function of the network device, and
wherein the network device trains the machine learning model using the analytics information.

2. The processing method of claim 1, wherein a model management server charges for providing the machine learning model to the network device.

3. The processing method of claim 2, wherein the model management server sets a charge for the machine learning model based on at least one of a property of the network device, a parameter of the machine learning model, a quality of the machine learning model, or a point in time at which the machine learning model is to be provided.

4. The processing method of claim 1, wherein the generating of the control command comprises generating the control command to control a user terminal based on the analytics information.

5. A processing method performed by a network device, the processing method comprising:
  receiving a machine learning model from a model management server;
  obtaining network data to generate analytics information;
  generating analytics information by inputting the network data to a machine learning model;
  feeding back the analytics information to the model management server; and
  generating a control command of the network device using the analytics information,
  wherein the analytics information is generated by a training plane function of the network device and the control command is generated using the analytics information by a control plane function of the network device,
  and
  wherein a model management server trains the machine learning model and charges for providing the machine learning model.

6. The processing method of claim 5, wherein the model management server sets a charge for the machine learning model based on at least one of a property of the network device, a parameter of the machine learning model, a quality of the machine learning model, or a point in time at which the machine learning model is to be provided.

7. A processing method performed by a model management server, the processing method comprising:
  providing a machine learning model to a network device; and
  charging for providing the machine learning model,
  wherein the network device is configured to analyze network data using a machine learning model in a training plane of the network device, and generate a control command to control a user terminal using analytics information which is a result of analyzing the network data in a control plane of the network device,
  wherein the analytics information is used for training of the machine learning model,
  wherein the network device is configured to feed back analytics information which is a result of analyzing the network data to the model management server, and
  wherein a model management server trains the machine learning model using the fed back analytics information or additionally collected network data.

* * * * *